United States Patent
Yang et al.

(10) Patent No.: US 10,280,356 B2
(45) Date of Patent: May 7, 2019

(54) ELECTRICALLY CONDUCTIVE OIL-BASED FLUIDS

(71) Applicant: BAKER HUGHES INCORPORATED, Houston, TX (US)

(72) Inventors: Jianzhong Yang, Missouri Ciy, TX (US); Alyssa Renee Garcia, Houston, TX (US); Joseph J. Arensdorf, Oak Ridge North, TX (US); Dennis K. Clapper, Houston, TX (US); Qusai A. Darugar, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 422 days.

(21) Appl. No.: 14/804,741

(22) Filed: Jul. 21, 2015

(65) Prior Publication Data
US 2016/0017202 A1    Jan. 21, 2016

Related U.S. Application Data

(60) Provisional application No. 62/026,979, filed on Jul. 21, 2014.

(51) Int. Cl.
  *C09K 8/32* (2006.01)
  *C09K 8/82* (2006.01)
  *C09K 8/64* (2006.01)

(52) U.S. Cl.
  CPC ............ *C09K 8/32* (2013.01); *C09K 8/64* (2013.01); *C09K 8/82* (2013.01); *C09K 2208/08* (2013.01); *C09K 2208/10* (2013.01)

(58) Field of Classification Search
  CPC ...... C09K 2208/10; C09K 8/032; C09K 8/32; C09K 8/805; C09K 8/80; C09K 8/82; C09K 8/03; C09K 8/05; C09K 8/36; C09K 8/524; C09K 8/528; C09K 8/64; C09K 8/34; C09K 8/58; C09K 5/10; C09K 5/14; C09K 8/04; C09K 8/26; C09K 8/76; E21B 41/00; E21B 43/267; E21B 17/042; E21B 47/12; E21B 43/25; E21B 43/26; E21B 21/06; E21B 21/062; E21B 23/06; E21B 7/046; E21B 21/003; E21B 21/065; E21B 33/13; E21B 33/138; E21B 33/14; E21B 36/04; E21B 43/088; E21B 43/128; E21B 43/14; E21B 43/16; E21B 43/24; E21B 43/34; E21B 47/04; E21B 47/1015
  See application file for complete search history.

(56) References Cited

U.S. PATENT DOCUMENTS

| | | |
|---|---|---|
| 5,990,050 A | 11/1999 | Patel |
| 6,006,831 A | 12/1999 | Schlemmer et al. |
| 6,208,265 B1 | 3/2001 | Smith |
| 6,308,788 B1 | 10/2001 | Patel et al. |
| 6,525,003 B2 | 2/2003 | Schlemmer et al. |
| 6,608,005 B2 | 8/2003 | Palmer et al. |
| 6,691,805 B2 | 2/2004 | Thaemlitz |
| 6,770,603 B1 | 8/2004 | Sawdon et al. |
| 6,787,505 B1 | 9/2004 | Maitland et al. |
| 7,032,664 B2 | 4/2006 | Lord et al. |
| 7,087,555 B2 | 8/2006 | Halliday et al. |
| 7,112,557 B2 | 9/2006 | Thaemlitz |
| 7,244,694 B2 | 7/2007 | Fu et al. |
| 7,399,731 B2 | 7/2008 | Jones et al. |
| 7,485,602 B2 | 2/2009 | Kirsner et al. |
| 7,803,740 B2 | 9/2010 | Bicerano et al. |
| 8,183,180 B2 | 5/2012 | Tour et al. |
| 8,469,118 B2 | 6/2013 | Passade-Boupat et al. |
| 8,763,695 B2 | 7/2014 | Van |
| 8,822,386 B2 * | 9/2014 | Quintero ................ C09K 8/032 507/117 |
| 2005/0063892 A1 * | 3/2005 | Tandon .................. B82Y 30/00 423/449.1 |
| 2010/0000441 A1 | 1/2010 | Jang et al. |
| 2010/0135937 A1 | 6/2010 | O'Brien et al. |
| 2011/0111988 A1 * | 5/2011 | Ionescu Vasii .......... C09K 8/34 507/103 |
| 2012/0015852 A1 * | 1/2012 | Quintero ................ C09K 8/032 507/112 |
| 2012/0103614 A1 | 5/2012 | Kalb et al. |
| 2012/0322694 A1 * | 12/2012 | Monteiro ............... C09K 8/032 507/105 |
| 2013/0269866 A1 | 10/2013 | Xu et al. |

FOREIGN PATENT DOCUMENTS

| | | |
|---|---|---|
| WO | 2009-089391 A2 | 7/2009 |
| WO | 2010-106115 A1 | 9/2010 |
| WO | 2014066295 A1 | 5/2014 |
| WO | WO2014/066295 * | 5/2014 |

OTHER PUBLICATIONS

Int'l Search Report & Written Opinion in PCT/US2015/041325 dated Oct. 6, 2015.

* cited by examiner

*Primary Examiner* — Kumar R Bhushan

(74) *Attorney, Agent, or Firm* — Mossman, Kumar & Tyler, PC

(57) ABSTRACT

Capped nanoparticles may be added to an oil-based fluid to improve the electrical conductivity of the oil-based fluid. The oil-based fluid may be a drilling fluid, a completion fluid, a drill-in fluid, a stimulation fluid, a servicing fluid, and combinations thereof. In a non-limiting embodiment, the oil-based fluid composition may be circulated in a subterranean reservoir wellbore.

9 Claims, No Drawings

ELECTRICALLY CONDUCTIVE OIL-BASED FLUIDS

CROSS-REFERENCE TO RELATED APPLICATION

This application claims the benefit of U.S. Provisional Patent Application Ser. No. 62/026,979 filed Jul. 21, 2014, incorporated herein by reference in its entirety.

TECHNICAL FIELD

The present invention relates to a fluid composition and a method for improving the electrical conductivity of an oil-based fluid that may be a drilling fluid, a completion fluid, a drill-in fluid, a stimulation fluid, and combinations thereof by adding capped nanoparticles to the oil-based fluid.

BACKGROUND

Fluids used in the drilling, completion, stimulation, and remediation of subterranean oil and gas wells are known. It will be appreciated that within the context herein, the term "fluid" also encompasses "drilling fluids", "completion fluids", "workover fluids", "servicing fluids", "stimulation fluids", and "remediation fluids".

Drilling fluids are typically classified according to their base fluid. In water-based fluids, solid particles are suspended in a continuous phase consisting of water or brine. Oil can be emulsified in the water, which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine. a Oil-based fluids are the opposite or inverse of water-based fluids. "Oil-based fluid" is used herein to include fluids that are completely oil, fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally occurring materials. Synthetic-based fluids often include, but are not necessarily limited to, olefin oligomers of ethylene, esters made from vegetable fatty acids and alcohols, ethers and polyethers made from alcohols and polyalcohols, paraffinic and/or aromatic hydrocarbons, alkyl benzenes, terpenes and other natural products and mixtures of these types.

For some applications, in particular for the use of some wellbore imaging tools, it is important to reduce the electrical resistivity (which is equivalent to increasing the electrical conductivity) of the oil-based fluid as the electrical conductivity of the fluids has a direct impact on the image quality. Certain resistivity logging tools, such as high resolution LWD tool STARTRAK™, available from Baker Hughes Inc, require the fluid to be electrically conductive to obtain the best image resolution. Water-based fluids, which are typically highly electrically conductive with a resistivity less than about 100 Ohm–m, are typically preferred for use with such tools in order to obtain a high resolution from the LWD logging tool.

However, oil based fluids are preferred in certain formation conditions, such as those with sensitive shales, or high pressure high temperature (HPHT) conditions where corrosion is abundant. Oil-based fluids are a challenge to use with high resolution resistivity tool, e.g. STARTRAK™, because oil-based fluids have a low electrical conductivity (i.e. high resistivity). It would be highly desirable if fluid compositions and methods could be devised to increase the electrical conductivity of the oil-based or non-aqueous-liquid-based drilling, completion, production, and remediation fluids and thereby allow for better utilization of resistivity logging tools.

There are a variety of functions and characteristics that are expected of completion fluids. The completion fluid may be placed in a well to facilitate final operations prior to initiation of production. Completion fluids are typically brines, such as chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof.

Chemical compatibility of the completion fluid with the reservoir formation and fluids is key. Chemical additives, such as polymers and surfactants are known in the art for being introduced to the brines used in well servicing fluids for various reasons that include, but are not limited to, increasing viscosity, and increasing the density of the brine. Water-thickening polymers serve to increase the viscosity of the brines and thus retard the migration of the brines into the formation and lift drilled solids from the wellbore. A regular drilling fluid is usually not compatible for completion operations because of its solids content, pH, and ionic composition. Completion fluids also help place certain completion-related equipment, such as gravel packs, without damaging the producing subterranean formation zones. Modifying the electrical conductivity and resistivity of completion fluids may allow the use of resistivity logging tools for facilitating final operations.

A stimulation fluid may be a treatment fluid prepared to stimulate, restore, or enhance the productivity of a well, such as fracturing fluids and/or matrix stimulation fluids in one non-limiting example.

Servicing fluids, such as remediation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations.

Before performing remedial operations, the production of the well must be stopped, as well as the pressure of the reservoir contained. To do this, any tubing-casing packers may be unseated, and then servicing fluids are run down the tubing-casing annulus and up the tubing string. These servicing fluids aid in balancing the pressure of the reservoir and prevent the influx of any reservoir fluids. The tubing may be removed from the well once the well pressure is under control. Tools typically used for remedial operations include wireline tools, packers, perforating guns, flow-rate sensors, electric logging sondes, etc.

A drill-in fluid may be used exclusively for drilling through the reservoir section of a wellbore successfully, which may be a long, horizontal drainhole. The drill-in fluid may minimize damage and maximize production of exposed zones, and/or facilitate any necessary well completion. A drill-in fluid may be a fresh water or brine-based fluid that contains solids having appropriate particle sizes (salt crystals or calcium carbonate) and polymers. Drill-in fluids may be aqueous or non-aqueous. Filtration control additives and additives for carrying cuttings may be added to a drill-in fluid.

It would be desirable if the aforementioned fluid compositions and methods for using such fluids could be tailored to improve the electrical conductivity of drilling fluids, completion fluids, stimulation fluids, drill-in fluids, and servicing fluids, and thereby enhance the performance of downhole tools, such as resistivity logging tools in one non-limiting example.

SUMMARY

There is provided, in one non-limiting form, a fluid composition having electrically conductive properties where the fluid composition may include an oil-based fluid, and electrically conductive capped carbon-based nanoparticles, such as but not limited to, graphene nanoparticles, graphene platelets, graphene oxide, nanorods, nanoplatelets, nanotubes, carbon blacks, carbon nanofibers, and combinations thereof.

In an alternative embodiment of the fluid composition, the oil-based fluid may be or include a drilling fluid, a completion fluid, a production fluid, a stimulation fluid, and combinations thereof. The amount of carbon-based nanoparticles within the fluid composition may range from about 0.0001 wt % to about 25 wt %.

In another non-limiting form, a method may include circulating a fluid composition into a subterranean reservoir wellbore. The fluid composition may include an oil-based fluid, and electrically conductive capped carbon-based nanoparticles, including but not necessarily limited to, graphene nanoparticles, graphene platelets, graphene oxide, nanorods, nanoplatelets, nanotubes, and combinations thereof.

In an alternative form of the method, the method for improving the electrical properties of a fluid may include adding an effective amount of electrically conductive capped carbon-based nanoparticles to an oil-based fluid to form a fluid composition having improved electrical properties. The electrically conductive capped carbon-based nanoparticles may be or include graphene nanoparticles, graphene platelets, graphene oxide, nanorods, nanoplatelets, nanotubes, carbon blacks, carbon nanofibers, and combinations thereof.

Capped nanoparticles improve the electrical conductivity of the downhole fluid composition.

DETAILED DESCRIPTION

It has been discovered that adding capped carbon-based nanoparticles to an oil-based fluid, to form a fluid composition, may improve the electrical conductivity of an oil-based fluid. The fluid composition may improve the use of a downhole tool, such as a resistivity-logging tool in a non-limiting example. These tools are typically only used in aqueous fluids, e.g. water-based fluids, because resistivity-logging tools require the fluid in the wellbore to be electrically conductive. The capped carbon-based nanoparticles, mentioned below, may be added or dispersed into at least one phase of the oil-based fluid, such as the continuous phase in a non-limiting embodiment. The fluid composition having the capped carbon-based nanoparticles may be used for a procedure, including but not necessarily limited to, well logging, drilling, completion, fracturing, acidizing, cementing, and combinations thereof.

Although the inventors do not wish to be bound by a particular theory, it is thought that capping the carbon-based nanoparticles, in a non-limiting embodiment, may decrease the oxygen reactivity of the carbon-based nanoparticles by capping at least one oxygen species of the carbon-based nanoparticles. In another non-limiting embodiment, the oxygen species that may be capped include, but are not limited to carboxylic acids, ketones, lactones, anhydrides, hydroxyls, and combinations thereof. The carbon-based nanoparticles may be functionalized nanoparticles or non-functionalized nanoparticles prior to capping the carbon-based nanoparticles. In some non-limiting embodiments, the carbon-based nanoparticles may be functionally modified to form functionalized nanoparticles, and capping the functionalized carbon-based nanoparticles may result in a carbon-based nanoparticle having a semi-muted functionalization. Said differently, the carbon-based functionalized nanoparticle may still maintain some of the functionalized characteristics, but to a lesser extent than a fully functionalized carbon-based nanoparticle that has not been capped. One skilled in the art would recognize when to cap or not cap a functionalized or non-functionalized carbon-based nanoparticle.

The capped carbon-based nanoparticles may be or include, but are not necessarily limited to, capped graphene nanoparticles, capped graphene platelets, capped graphene oxide, electrically conductive capped nanorods, electrically conductive capped nanoplatelets, electrically conductive capped nanotubes, electrically conductive capped carbon blacks, electrically conductive capped carbon nanofibers, and combinations thereof. 'Carbon-based nanoparticles' are defined herein to be nanoparticles having at least 50 mole % or greater of carbon atoms. In another non-limiting embodiment, the nanotubes, nanorods, and/or nanoplatelets may be metallic, ceramic, or combinations thereof in an alternative embodiment.

The non-capped carbon-based nanoparticles may be capped with a capping component, such as but not limited to, metal carbonyl species, metal nanoparticles, and combinations thereof. The capping may occur by a method, including but not limited to, physical capping, chemical capping, and combinations thereof. The carbon-based nanoparticles may or may not be functionally modified prior to capping the carbon-based nanoparticles. In a non-limiting embodiment, the electrically conductive carbon-based nanoparticles are capped (e.g. physical and/or chemical capping) prior to adding the nanoparticles to the base fluid.

A physical capping may occur by altering the ability of the oxygen species on or within the carbon-based nanoparticles by decreasing/eliminating electrostatic interactions, ionic interactions, and the like. Alternatively, physical capping may occur by physical absorption of the oxygen species, such as by chemical vapor deposition under thermolysis in a non-limiting embodiment. In a non-limiting example, metal carbonyl species may be used to aid in physically capping the carbon-based nanoparticles, including but not limited to platinum carbonyls, gold carbonyls, silver carbonyls, copper carbonyls, and combinations thereof. In an alternative non-limiting embodiment, metal nanoparticles may be used for physically capping the carbon-based nanoparticles, including but not limited to platinum nanoparticles, gold nanoparticles, silver nanoparticles, copper nanoparticles, and combinations thereof.

In a non-limiting embodiment, the carbon-based nanoparticles may be encapsulated prior to physically capping the nanoparticles; alternatively, the carbon-based nanoparticles may not be encapsulated prior to physically capping the nanoparticles.

The amount of metal carbonyl species and/or the amount of metal nanoparticles for capping the carbon-based nanoparticles may range from about 0.1 wt % independently to about 10 wt % in a non-limiting embodiment, alternatively from about 1 wt % independently to about 5 wt %.

A chemical capping may occur by modifying chemical bonds of the carbon-based nanoparticles to alter the oxygen reactivity of the nanoparticles, chemical absorption of the oxygen species, and the like. A non-limiting example of a chemical capping may include altering the polarity of an oxygen species of the carbon-based nanoparticle to be a non-polar or less polar oxygen species. Other non-limiting examples of chemical capping may occur by performing a reaction with the oxygen species with the appropriate reactant for each reaction, such as but not limited to a Grignard reaction, an alkyl esterification, an amidation, silanation with organic silanes, and combinations thereof. For each type of chemical capping reaction, the amount of respective reactants may range from about 1 wt % independently to about 5 wt %.

The capped carbon-based nanoparticles may be present in the base fluid in an amount effective to improve the performance of a downhole tool as compared to an otherwise identical fluid absent the capped carbon-based nanoparticles. The amount of capped carbon-based nanoparticles within the downhole fluid composition may range from about 0.0001 wt % independently to about 15 wt % to modify the electrical conductivity of the fluid. In a non-limiting embodiment, the capped carbon-based nanoparticles may be added or included in the base fluid in an amount ranging from about 0.001 wt % independently to about 5 wt %, alternatively from about 0.01 wt % independently to about 1 wt %.

The final electrical conductivity of the downhole fluid composition may be determined by the content and the inherent properties of the dispersed phase content, which may be tailored to achieve desired values of electrical conductivity. The final resistivity (inverse of electrical conductivity) of the downhole fluid composition may range from about 0.02 ohm–m independently to about 1,000,000 ohm–m in one non-limiting embodiment. In an alternative embodiment, the resistivity may range from about 0.2 ohm–m independently to about 10,000 ohm–m, or from about 2 ohm–m independently to about 1,000 ohm–m. Achieving this range of electrical conductivity within an oil-based fluid represents a decrease of 6-9 orders of magnitude as compared with the electrical conductivity of typical oil-based fluids absent the capped carbon-based nanoparticles. As used herein with respect to a range, "independently" means that any threshold may be used together with another threshold to give a suitable alternative range, e.g. about 0.02 ohm–m independently to about 0.2 ohm–m is also considered a suitable alternative range.

In another non-limiting embodiment, the downhole fluid composition may include a carbon-based type of non-capped carbon-based nanoparticles, such as but not limited to, graphite nanoparticles, graphene nanoparticles, graphene platelets, fullerenes, nanotubes, nanorods, nanoplatelets, and combinations thereof. In a non-limiting embodiment, the capped carbon-based nanoparticles, carbon blacks, and/or non-capped carbon-based nanoparticles and/or nanofibers, may synergistically improve the electrical conductivity of the downhole fluid.

The capped carbon blacks may be or include acetylene black, channel black, furnace black, lamp black, thermal black, and the like. Carbon black is a material produced by the incomplete combustion of heavy petroleum products, including but not limited to, FCC tar, coal tar, ethylene cracking tar, vegetable oil, and combinations thereof. Carbon black has a high surface-area-to-volume ratio because of its paracrystalline carbon structure. In a non-limiting embodiment, the downhole fluid composition may include capped and non-capped carbon black nanoparticles, capped and non-capped micron-sized particles, and combinations thereof.

The amount of non-capped carbon-based nanoparticles within the downhole fluid composition may range from about 0.0001 wt % independently to about 15 wt % to modify the electrical conductivity of the fluid. In a non-limiting embodiment, the carbon-based nanoparticles may be added in an amount ranging from about 0.001 wt % independently to about 5 wt %, alternatively from about 0.01 wt % independently to about 1 wt %.

The capped or non-capped carbon-based nanoparticles may be functionally modified by a mechanism to form a functionalized nanoparticle. In a non-limiting embodiment, the functional modification improves the electrical conductivity of the carbon-based nanoparticles. The functional modification may be or include, but is not limited to a chemical modification, a covalent modification, a physical modification, a surface modification, and combinations thereof. Thus, 'functionalized nanoparticles' are defined herein to be the nanoparticle having an increased or decreased functionality, and the 'functional modification' is the process by which the nanoparticle has had a particular functionality increased or decreased. The functionalized nanoparticles may have different functionalities than nanoparticles that have not been functionally modified. In a non-limiting embodiment, the functional modification of the carbon-based nanoparticles may improve the dispersibility of the carbon-based nanoparticles in an oil-based fluid by stabilizing the carbon-based nanoparticles in suspension, which avoids undesirable flocculation as compared with otherwise identical carbon-based nanoparticles that have not been functionally modified. In one non-limiting embodiment of the invention, it is desirable that the conductivity properties of the fluid be uniform, which requires the distribution of the carbon-based nanoparticles to be uniform. If the carbon-based nanoparticles flocculate, drop out, or precipitate, the electrical conductivity of the fluid may change.

Graphene is an allotrope of carbon having a planar sheet structure that has $sp^2$-bonded carbon atoms densely packed in a 2-dimensional honeycomb crystal lattice. The term "graphene" is used herein to include particles that may contain more than one atomic plane, but still with a layered morphology, i.e. one in which one of the dimensions is significantly smaller than the other two, and also may include any graphene that has been functionally modified. The structure of graphene is hexagonal, and graphene is often referred to as a 2-dimensional (2-D) material. The 2-D morphology of the graphene nanoparticles is of utmost importance when carrying out the useful applications relevant to the graphene nanoparticles. The applications of graphite, the 3-D version of graphene, are not equivalent to the 2-D applications of graphene. The graphene may have at least one graphene sheet, and each graphene platelet may have a thickness no greater than 100 nm.

Graphene is in the form of one-atomic layer thick or multi-atomic layer thick platelets. Graphene platelets may have in-plane dimensions ranging from sub-micrometer to about 100 micrometers. This type of platelet shares many of the same characteristics as carbon nanotubes. The platelet chemical structure makes it easier to functionally modify the platelet for enhanced dispersion in polymers. Graphene platelets provide electrical conductivity that is similar to copper, but the density of the platelets may be about four times less than that of copper, which allows for lighter materials. The graphene platelets may also be fifty (50) times stronger than steel with a surface area that is twice that of carbon nanotubes.

Graphene may form the basis of several nanoparticle types, including but not limited to the graphite nanoparticle, nanotubes, fullerenes, and the like. Several graphene sheets layered together may form a graphite nanoparticle. In a non-limiting embodiment, a graphite nanoparticle may have from about 2 layered graphene sheets independently to about 20 layered graphene sheets to form the graphite nanoparticle, or about 3 layered graphene sheets independently to about 25 layered graphene sheets in another non-limiting example. Graphite nanoparticles may range from about 1 independently to about 50 nanometers thick, or from about 3 nm independently to about 25 nm thick.

Graphite nanoparticles are graphite (natural or synthetic) species downsized into a submicron size by a process, including but not limited to a mechanic milling process to form graphite platelets, or a laser ablating technique to form a graphite nanoparticle having a spherical structure. The spherical structure may range in size from about 30 nm independently to about 999 nm, or from about 50 nm independently to about 500 nm. In a non-limiting embodiment, the spherical graphite nanoparticles may have a 3D structure. Graphite nanoparticles have different chemical properties because of the layered graphene effect, which allows them to be more electrically conductive than a single graphene sheet.

In another non-limiting embodiment, the graphene sheet may form a substantially spherical structure having a hollow inside, which is known as a fullerene. This cage-like structure allows a fullerene to have different properties or features as compared to graphite nanoparticles or graphene nanoparticles. For the most part, fullerenes are stable structures, but a non-limiting characteristic reaction of a fullerene is an electrophilic addition at 6,6 double bonds to reduce angle strain by changing a $sp^2$-hybridized carbon into a $sp^3$-hybridized carbon. In another non-limiting example, fullerenes may have other atoms trapped inside the hollow portion of the fullerene to form an endohedral fullerene. Metallofullerenes are non-limiting examples where one or two metallic atoms are trapped inside of the fullerene, but are not chemically bonded within the fullerene. Although fullerenes are not electrically conductive alone, a functional modification to the fullerene may enhance a desired property thereto. Such functional modifications may include, but are not necessarily limited to, chemical modifications, physical modifications, covalent modifications, and/or surface modifications to form a functionalized fullerene.

In another non-limiting embodiment, the graphene sheet may form a cylindrical sheet, which is known as a carbon nanotube or cylindrical fullerenes. Carbon nanotubes are defined herein as allotropes of carbon consisting of one or several single-atomic layers of graphene rolled into a cylindrical nanostructure. Nanotubes may be single-walled, double-walled or multi-walled; nanotubes may also be open-ended or closed-ended. Nanotubes have high tensile strength, high electrical conductivity, high ductility, high heat conductivity, and relative chemical inactivity such that there are no exposed atoms that may be easily displaced.

In the present context, the carbon-based nanoparticles may have at least one dimension less than 50 nm, although other dimensions may be larger than this. In a non-limiting embodiment, the carbon-based nanoparticles may have one dimension less than 30 nm, or alternatively less than 10 nm. In one non-limiting instance, the smallest dimension of the carbon-based nanoparticles may be less than 5 nm, but the length of the carbon-based nanoparticles may be much longer than 100 nm, for instance 25,000 nm or more. Alternatively, all dimensions of the capped and/or non-capped carbon-based nanoparticles are less than 999 nm. Such carbon-based nanoparticles would be within the scope of the fluids herein.

Carbon-based nanoparticles typically have at least one dimension less than 100 nm (one hundred nanometers). While materials on a micron scale have properties similar to the larger materials from which they are derived, assuming homogeneous composition, the same is not true of carbon-based nanoparticles. An immediate example is the very large interfacial or surface area per volume for carbon-based nanoparticles. The consequence of this phenomenon is a very large potential for interaction with other matter, as a function of volume. For carbon-based nanoparticles, the surface area may be up to 1800 $m^2/g$. Additionally, because of the very large surface area to volume present with graphene, it is expected that in most, if not all cases, much less proportion of graphene nanoparticles need be employed relative to micron-sized additives conventionally used to achieve or accomplish a similar effect.

Nevertheless, it should be understood that carbon-based nanoparticles may be surface-modified functionalized nanoparticles, which may find utility in the compositions and methods herein. "Surface-modification" is defined here as the process of altering or modifying the surface properties of a particle by any means, including but not limited to physical, chemical, electrochemical or mechanical means, and with the intent to provide a unique desirable property or combination of properties to the surface of the nanoparticle, which differs from the properties of the surface of the unprocessed nanoparticle.

The carbon-based nanoparticles may be functionally modified to introduce chemical functional groups thereon, for instance by reacting the graphene nanoparticles with a peroxide such as diacyl peroxide to add acyl groups which are in turn reacted with diamines to give amine functionality, which may be further reacted. Functionalized carbon-based nanoparticles are defined herein as those which have had their edges or surfaces functionally modified to contain at least one functional group including, but not necessarily limited to, sulfonate, sulfate, sulfosuccinate, thiosulfate, succinate, carboxylate, hydroxyl, glucoside, ethoxylate, propoxylate, phosphate, ethoxylate, ether, amines, amides, ethoxylate-propoxylate, an alkyl, an alkenyl, a phenyl, a benzyl, a perfluoro, thiol, an ester, an epoxy, a keto, a lactone, a metal, an organo-metallic group, an oligomer, a polymer, or combinations thereof.

Introduction of functional groups by derivatizing the olefinic functionality associated with the carbon-based nanoparticles may be effected by any of numerous known methods for direct carbon-carbon bond formation to an olefinic bond, or by linking to a functional group derived from an olefin. Exemplary methods of functionally modifying may include, but are not limited to, reactions such as oxidation or oxidative cleavage of olefins to form alcohols, diols, or carbonyl groups including aldehydes, ketones, or carboxylic acids; diazotization of olefins proceeding by the Sandmeyer reaction; intercalation/metallization of a nanodiamond by treatment with a reactive metal such as an alkali metal including lithium, sodium, potassium, and the like, to form an anionic intermediate, followed by treatment with a molecule capable of reacting with the metalized nanodiamond such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of transmetalated species with boron, zinc, or tin groups which react with e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, and combinations thereof.

Covalent modification may include, but is not necessarily limited to, oxidation and subsequent chemical modification of oxidized carbon-based nanoparticles, fluorination, free radical additions, addition of carbenes, nitrenes and other radicals, arylamine attachment via diazonium chemistry, and the like. Besides covalent modification, chemical modification may occur by introducing noncovalent functionalization, electrostatic interactions, π-π interactions and polymer interactions, such as wrapping a nanoparticle with a polymer, direct attachment of reactants to carbon-based nanoparticles by attacking the $sp^2$ bonds, direct attachment to ends of carbon-based nanoparticles or to the edges of the carbon-based nanoparticles, and the like.

It will be appreciated that the above methods are intended to illustrate the concept of functionally modifying the nanoparticles to introduce functional groups to a carbon-based nanoparticle, and should not be considered as limiting to such methods.

Prior to functional modification, the carbon-based nanoparticle may be exfoliated. Exemplary exfoliation methods include, but are not necessarily limited to, those practiced in the art, including but not necessarily limited to, fluorination, acid intercalation, acid intercalation followed by thermal shock treatment, and the like. Exfoliation of the graphene provides a graphene having fewer layers than non-exfoliated graphene.

The effective medium theory states that properties of materials or fluids comprising different phases can be estimated from the knowledge of the properties of the individual phases and their volumetric fraction in the mixture. In particular if a conducting particle is dispersed in a dielectric fluid, the electrical conductivity of the dispersion will slowly increase for small additions of carbon-based nanoparticles. As the capped and/or non-capped carbon-based nanoparticles are continually added to the dispersion, the conductivity of the fluid increases, i.e. there is a strong correlation between increased conductivity and increased concentration of capped and/or non-capped carbon-based nanoparticles. This concentration is often referred to as the percolation limit.

In the case of electrical conductivity, conductivity of nanofluids (i.e. dispersion of carbon-based nanoparticles in fluids), the percolation limit decreases with decreasing the size of the carbon-based nanoparticles. This dependence of the percolation limit on the concentration of the carbon-based nanoparticles holds for other fluid properties that depend on inter-particle average distance.

There is also a strong dependence on the shape of the carbon-based nanoparticles dispersed within the phases for the percolation limit of nano-dispersions. The percolation limit shifts further towards lower concentrations of the dispersed phase if the carbon-based nanoparticles have characteristic 2-D (platelets) or 1-D (nanotubes or nanorods) morphology. Thus the amount of 2-D or 1-D carbon-based nanoparticles necessary to achieve a certain change in property is significantly smaller than the amount of 3-D carbon-based nanoparticles that would be required to accomplish a similar effect.

In one sense, such fluids have made use of carbon-based nanoparticles for many years, since the clays commonly used in drilling fluids are naturally-occurring, 1 nm thick discs of aluminosilicates. Such carbon-based nanoparticles exhibit extraordinary rheological properties in water and oil. However, in contrast, the carbon-based nanoparticles that are the main topic herein are synthetically formed carbon-based nanoparticles where size, shape and chemical composition are carefully controlled and give a particular property or effect.

The fluids herein may contain capped carbon-based nanoparticles, optional carbon black, and optional non-capped carbon-based nanoparticles to improve the electrical conductivity of the fluids. In some cases, the carbon-based nanoparticles may change the properties of the fluids in which they reside, based on various stimuli including, but not necessarily limited to, temperature, pressure, rheology, pH, chemical composition, salinity, and the like. This is due to the fact that the carbon-based nanoparticles can be custom designed on an atomic level to have very specific functional groups, and thus the carbon-based nanoparticles react to a change in surroundings or conditions in a way that is beneficial. It should be understood that it is expected that carbon-based nanoparticles may have more than one type of functional group, making them multifunctional. Multifunctional carbon-based nanoparticles may be useful for simultaneous applications, in a non-limiting example of a fluid, lubricating the bit, increasing the temperature stability of the fluid, stabilizing the shale while drilling and provide low shear rate viscosity. In another non-restrictive embodiment, carbon-based nanoparticles suitable for stabilizing shale include those having an electric charge that permits them to associate with the shale.

In another non-limiting embodiment, the downhole fluid composition may include a surfactant in an amount effective to suspend the capped carbon-based nanoparticles, optional carbon black, and optional non-capped carbon-based nanoparticles in the downhole fluid. The surfactant may be present in the downhole fluid composition in an amount ranging from about 1 vol % independently to about 10 vol %, or from about 2 vol % independently to about 8 vol % in another non-limiting embodiment.

The use of optional surfactants together with the capped carbon based nanoparticles, optional carbon black, and optional non-capped carbon-based nanoparticles may form self-assembly structures that may enhance the thermodynamic, physical, and rheological properties of these types of fluids. The capped carbon-based nanoparticles, optional carbon black, and optional non-capped carbon-based nanoparticles are dispersed in the oil-based fluid. The base fluid may be a non-aqueous fluid that may be a single-phase fluid or a poly-phase fluid, such as an emulsion of water-in-oil (W/O). The capped carbon-based nanoparticles may be used in conventional operations and challenging operations that require stable fluids for high temperature and pressure conditions (HTHP).

Expected suitable surfactants may include, but are not necessarily limited to non-ionic, anionic, cationic, amphoteric surfactants and zwitterionic surfactants, janus surfactants, and blends thereof. Suitable nonionic surfactants may include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants may include alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants may include, but are not necessarily limited to, arginine methyl esters, alkanolamines and alkylenediamides. Suitable surfactants may also include surfactants containing a non-ionic spacer-arm central extension, and an ionic or nonionic polar group. Other suitable surfactants may be dimeric or gemini surfactants, cleavable surfactants, janus surfactants and extended surfactants, also called extended chain surfactants.

Enhanced electrical conductivity of the fluids may form an electrically conductive filter cake that highly improves real time high resolution logging processes, as compared with an otherwise identical fluid absent the capped carbon-based nanoparticles.

In one non-limiting embodiment, the downhole fluid composition may include the oil-based fluid, and the capped carbon-based nanoparticles; but in the absence of the optional carbon black, the optional non-capped carbon-based nanoparticles, and/or the optional surfactant. In another non-limiting embodiment, the downhole fluid composition may include the oil-based fluid, the capped carbon-based nanoparticles, and an optional surfactant; but in the absence of the optional carbon black, and the optional non-capped carbon-based nanoparticles. Alternatively, the downhole fluid composition may include the oil-based fluid, the capped carbon-based nanoparticles, and optional non-capped carbon-based nanoparticles; but in the absence of the optional surfactant, and the optional carbon black. In yet another non-limiting embodiment, the downhole fluid composition may include the oil-based fluid, the capped nanoparticles, the optional surfactant, and the optional non-capped carbon-based nanoparticles; but in the absence of the optional carbon black. In another alternative non-limiting embodiment, the downhole fluid composition may include the oil-based fluid, the capped carbon-based nanoparticles, the optional surfactant, the optional non-capped carbon-based nanoparticles, and the optional carbon black (nanoparticle or not).

The downhole fluid composition may be circulated into a subterranean reservoir wellbore where the downhole fluid comprises the oil-based fluid, the capped carbon-based nanoparticles, the optional surfactant, the optional carbon black, and/or the optional non-capped carbon-based nanoparticles. A downhole tool may be operated with the downhole fluid composition at the same time or different time as the circulating of the downhole fluid. The downhole tool may have or provide an improved image as compared to a downhole tool being operated at the same time or different time as a downhole fluid absent the capped carbon-based nanoparticles.

Other benefits that may arise from modifying the electrical conductivity of the downhole fluids may include enabling the implementation of measuring tools based on resistivity with superior image resolution, and improving the ability of a driller to improve its efficiency in the non-limiting instance of drilling fluids and/or completion fluids. It may also be conceivable that an electric signal may be able to be carried through the downhole fluids across longer distances, such as across widely spaced electrodes in or around the bottom-hole assembly, or even from the bottom of the wellbore to intermediate stations or the surface of the well.

The invention will be further described with respect to the following Examples, which are not meant to limit the invention, but rather to further illustrate the various embodiments.

EXAMPLES

Example 1

'Sample 1' included 5.0 g of nano-sized carbon black 5303 (Asbury) dispersed in 171 g of ESCAID 110 (a mineral oil), and the electrical resistivity was measured. Sample 1 included 0 wt % the additive as noted in Table 1, i.e. 1-hexanol and NAXONAC 8401 (Nease).

'Sample 2' included the same components as sample 1, but 5.0 g of 1-hexanol was also charged into the dispersion followed by 0.2 g NAXONAC 8401 (Nease). Sample 2 was heated to 125° C. under nitrogen for 30 minutes, then the temperature was increased to 145° C. for 30 min, then gradually increased to 160° C. Sample 2 was subjected to a temperature of 160° C. for 3 hrs. Water was distilled and collected with a Dean-stark trap. The final homogeneous dispersion was collected, and the electrical resistivity was measured. Sample 2 included 3 wt % of the additive as noted in Table 1, i.e. 1-hexanol and Nease.

As noted in Table 1, Sample 2, which included the capped nano-sized carbon black particles, had a much lower resistance as compared to Sample 1 of the base oil that does not include the capped nano-sized carbon black particles.

TABLE 1

Electrical Resistance of Capped Carbon Black Compared to Non-capped Carbon Black

| Sample | Wt % additive | Resistance (Ohm) |
|---|---|---|
| 1 | 0 | 7.65E+06 |
| 2 | ~3 | 1650 |

Example 2

The capped nano-sized carbon black particles from Sample 2 in Example 1 were added to a formulation including 11.5 pounds per gallon (ppg) (1378 kg/m$^3$) of a mud with a 75:25 oil/water ratio. The formulation included 165 g of ESCAID 110 (a mineral oil), 4 g of CARBO-GEL™ (a viscosifier), 12 g of a non-ionic emulsifier, 92 g of a calcium chloride brine, 211 g of MIL-BAR™ (a weighting agent), and 20 g of capped carbon black. The electrical resistance of the formulation with the capped carbon black was determined to be 4.0E+4 Ohm.

Example 3

'Sample 1' included 5.0 g of nano-sized carbon black 5303 (Asbury) dispersed in 171 g of ESCAID 110 (a mineral oil), and the electrical resistivity was measured. Sample 1 included 0 wt % the additive as noted in Table 2, i.e. triethoxy octyl silane, isopropanol, and Nease.

'Sample 2' included the same components as sample 1, but 5.0 g triethoxy octyl silane was also charged into the dispersion followed by 2.0 g of isopropanol and 0.2 g NAXONAC 8401 (Nease). Sample 2 was heated to 70° C. under nitrogen for 30 minutes, then the temperature was increased to 90° C. for 120 min, and gradually increased to 135° C. Sample 2 was subjected to a temperature of 135° C. for 3 hrs. The alcohols were distilled and collected with a Dean-Stark trap. The final homogeneous dispersion was collected, and the electrical resistivity was measured. Sample 2 included 3 wt % of the additive as noted in Table 1, i.e. triethoxy octyl silane, isopropanol, and Nease.

As noted in Table 2, Sample 2, which included the capped nano-sized carbon black, had a much lower resistance as compared to Sample 1 of the base oil that does not include the capped nano-sized carbon black particles.

TABLE 2

Electrical Resistance of Capped Carbon Black Compared to Non-Capped Carbon Black

| Sample | % additive | Resistance (Ohm) |
| --- | --- | --- |
| 1 | 0 | 7.65E+06 |
| 2 | ~3 | 127 |

In the foregoing specification, the invention has been described with reference to specific embodiments thereof, and has been suggested as effective in providing effective fluid compositions and methods for improving the electrical conductivity of a downhole fluid composition. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and/or reaction conditions for forming the capped carbon-based nanoparticles, whether modified to have particular shapes or certain functional groups thereon, but not specifically identified or tried in a particular oil-based fluid to improve the properties therein, are anticipated to be within the scope of this invention.

The present invention may suitably comprise, consist or consist essentially of the elements disclosed and may be practiced in the absence of an element not disclosed. For instance, the fluid composition may consist of or consist essentially of an oil-based fluid, and electrically conductive capped carbon-based nanoparticles, including but not limited to, capped graphene nanoparticles, capped graphene platelets, graphene oxide, nanorods, nanoplatelets, nanotubes, carbon blacks, carbon nanofibers, and combinations thereof.

The method may consist of or consist essentially of circulating a fluid composition into a subterranean reservoir wellbore; the fluid composition may include an oil-based fluid, and electrically conductive capped carbon-based nanoparticles, such as but not limited to, graphene nanoparticles, graphene platelets, graphene oxide, nanorods, nanoplatelets, nanotubes, and combinations thereof.

The words "comprising" and "comprises" as used throughout the claims is to be interpreted as meaning "including but not limited to".

What is claimed is:

1. A fluid composition having electrically conductive properties; wherein the fluid composition comprises:
   an oil-based fluid;
   electrically conductive capped carbon-based nanoparticles comprising carbon nanotubes, carbon blacks, and carbon nanofibers; and
   a combination of non-capped carbon-based particles and non-capped metal nanoparticles; wherein the amount of non-capped carbon-based nanoparticles within the fluid composition ranges from about 0.0001 wt % to about 15 wt %; and wherein the electrically conductive capped carbon-based nanoparticles are capped with 0.1 wt % to 10 wt % of a capping component selected from the group consisting of platinum carbonyls, gold carbonyls, silver carbonyls, copper carbonyls, platinum nanoparticles, gold nanoparticles, silver nanoparticles, copper nanoparticles, and combinations thereof.

2. The fluid composition of claim 1, wherein the electrically-conductive capped carbon-based nanoparticles are present in the base fluid in an amount effective to improve the performance of a downhole tool by increasing the electrical conductivity of the fluid composition as compared to an otherwise identical fluid absent the electrically conductive capped carbon-based nanoparticles.

3. The fluid composition of claim 1, wherein the amount of electrically conductive capped carbon-based nanoparticles within the fluid composition ranges from about 0.0001 wt % to about 25 wt %.

4. The fluid composition of claim 1, wherein the electrically conductive capped carbon-based nanoparticles are physically capped carbon-based nanoparticles.

5. The fluid composition of claim 1, wherein the electrically conductive capped carbon-based nanoparticles are formed by reacting non-capped carbon-based nanoparticles with metal nanoparticles.

6. A fluid composition comprising:
   an oil-based fluid; and
   electrically conductive capped carbon-based nanoparticles comprising carbon nanotubes, carbon blacks, and carbon nanofibers; wherein the amount of carbon-based nanoparticles within the fluid composition ranges from about 0.0001 wt % to about 25 wt %; wherein the capped carbon blacks are made up of acetylene black, channel black, furnace black, lamp black, and/or thermal black; and wherein the electrically conductive capped carbon-based nanoparticles are capped with 0.1 wt % to 10 wt % of a capping component selected from the group consisting of platinum carbonyls, gold carbonyls, silver carbonyls, copper carbonyls, platinum nanoparticles, gold nanoparticles, silver nanoparticles, copper nanoparticles, and combinations thereof.

7. The fluid composition of claim 6 further comprising an additional component that is a combination of non-capped carbon-based particles, and non-capped metal nanoparticles.

8. The fluid composition of claim 6, wherein the electrically conductive capped carbon-based nanoparticles are physically capped carbon-based nanoparticles.

9. The fluid composition of claim 6, wherein the electrically conductive capped carbon-based nanoparticles are formed by reacting non-capped carbon-based nanoparticles with metal nanoparticles.

* * * * *